United States Patent
Mueggenberg (12)

(10) Patent No.: US 6,202,317 B1
(45) Date of Patent: Mar. 20, 2001

(54) APPARATUS AND METHOD FOR DETERMINING WHETHER A VEHICLE IS LOCATED IN A SPOT BEAM

(75) Inventor: Craig P. Mueggenberg, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/364,386

(22) Filed: Jul. 30, 1999

(51) Int. Cl.[7] ............................ G06F 165/00; G01C 21/00
(52) U.S. Cl. ............................. 33/613; 702/150; 702/152
(58) Field of Search .............................. 33/1 A, 1 CC, 33/613, 1 SB, 1 SD, 1 SA; 702/150, 152, 166, 401, 144, 404

(56) References Cited

U.S. PATENT DOCUMENTS

| | | | |
|---|---|---|---|
| 6,016,606 | * | 1/2000 | Oliver et al. .......................... 33/1 SD |
| 6,072,430 | * | 6/2000 | Wyrwas et al. ....................... 701/213 |

* cited by examiner

Primary Examiner—Diego Gutierrez
Assistant Examiner—Yaritza Guadalupe
(74) Attorney, Agent, or Firm—Nathan O. Jensen; Kyle Eppele; J. P. O'Shaughnessy

(57) ABSTRACT

A method and apparatus for determining the inclusion or exclusion of a current position of an aircraft within a satellite communication spot beam, which uses a technique of slightly moving the position being checked for inclusion, when it is determined that a ray drawn from the current position is coextensive with an endpoint of any line segment making up a boundary of the spot beam.

19 Claims, 2 Drawing Sheets

APPARATUS AND METHOD FOR DETERMINING WHETHER A VEHICLE IS LOCATED IN A SPOT BEAM

FIELD OF THE INVENTION

The present invention generally relates to satellite communication, and more particularly relates to mobile satellite communication, and even more particularly relates to apparatuses and methods for controlling the operation of a mobile satellite transceiver.

BACKGROUND OF THE INVENTION

In the past, avionics engineers have endeavored to change the operation of a mobile transceiver depending upon the location of the transceiver with respect to the boundaries of geographic areas which have predetermined exposure to satellite signals for satellite communication. These predetermined geographic areas are often referred to as spot beams. If an aircraft is within the spot beam, the satellite communication transceiver will be operated differently than if it is outside of a spot beam. However, since aircraft travel at relatively high velocity, they may enter and exit several spot beams during a single flight. In the past, determining whether the aircraft is in a spot beam has often taken considerable time and consumed valuable computing resources on the aircraft.

One well-known approach has been to draw a line from the given point to any point that is known to be outside of the spot beam boundary (polygon), e.g. to infinity, and then counting the number of times the line intersects the polygon boundary. If the number of intersections is odd, then the given point is inside the polygon. If the number of intersections is even, then the point is outside the polygon. The same method can be applied to spherical coordinates; i.e. let the North Pole be the point outside of the polygon; this can be assumed for the case of a geo-stationary satellite spot beam.

However, some of these prior art methods do not always accurately determine the presence of the aircraft within a spot beam, especially with respect to intersections occurring at vertices of the line segments of the polygon.

Consequently, there exists a need for improvement in methods and apparatuses for determining whether a mobile transceiver is within a spot beam.

SUMMARY OF THE INVENTION

It is an object of the present invention to provide enhanced quality of the determination of presence within a spot beam.

It is a feature of the present invention to use a slight latitudinal displacement of the current position in the process of determining location within a spot beam.

It is an advantage of the present invention to reduce ambiguity resulting from infinity lines drawn through vertices between adjacent line segments of the polygon.

It is another advantage of the present invention to reduce the computing resources necessary to make the spot beam determination with an adequate level of certainty.

The present invention is an apparatus and method for determining the location of a mobile satellite transceiver within a spot beam, which is designed to satisfy the aforementioned needs, provide the previously stated objects, include the above-listed features and achieve the already articulated advantages. The present invention is carried out in an "ambiguity-less manner" in a sense that the ambiguity associated with an intersection of a line drawn to infinity and through a vertex of two adjacent line segments of the spot beam polygon boundary, is greatly reduced.

Accordingly, the present invention is a system and method for determining presence within a spot beam by making a displacement of the current position and making a presence determination from the new position.

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
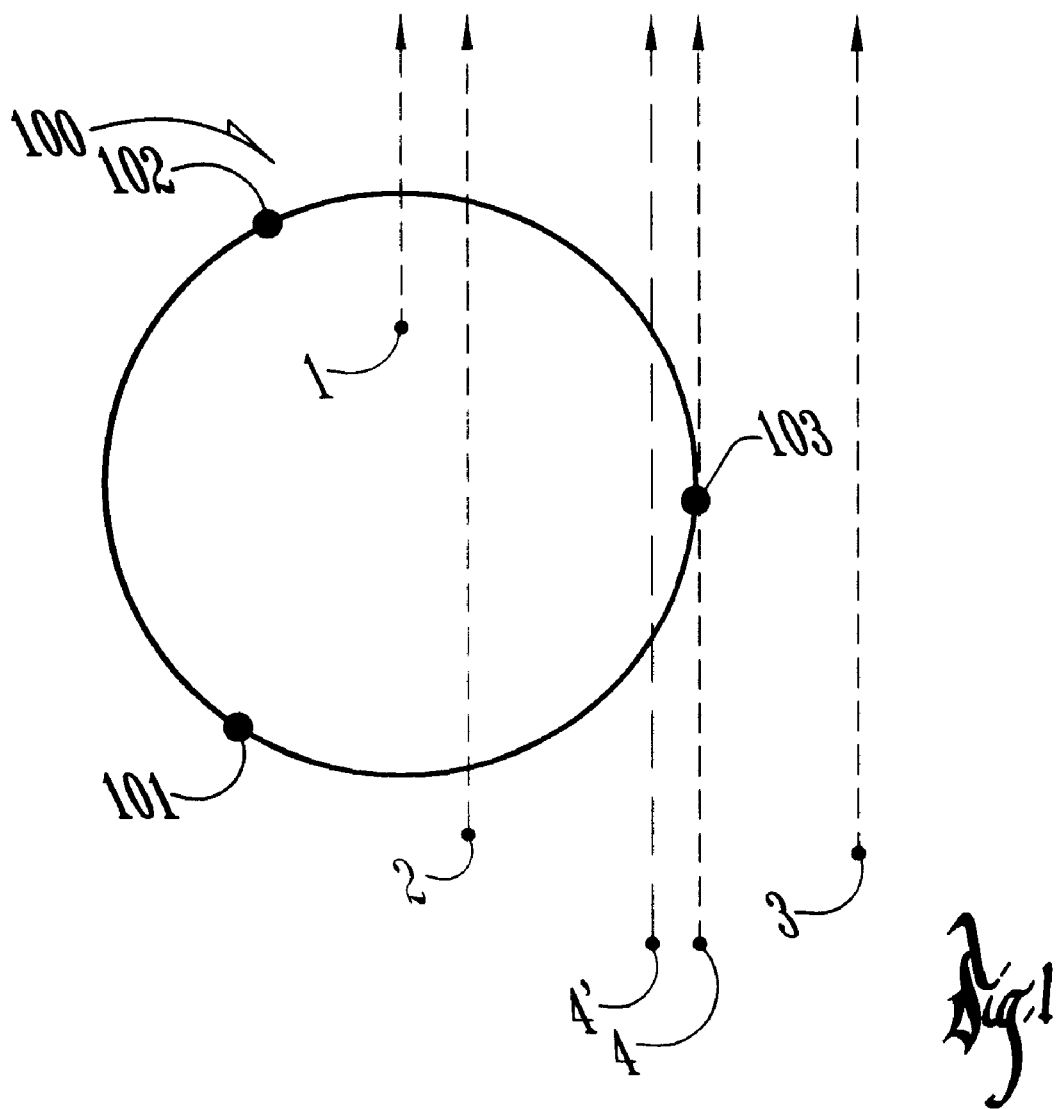
FIG. 1 is a simplified diagram of a method of the present invention, in which all of the dashed lines are drawn toward the North Pole.

Now referring to the drawings, wherein like numerals refer to like matter throughout, and more particularly to FIG. 1, there is shown a simplified view of a plot of a representative spot beam, generally designated 100, which is made up of a group of line segments having vertices 101, 102 and 103. The line segments between the vertices may be great circle arc, as depicted in FIG. 1, for a spherical coordinate system, or they may be straight lines when a Cartesian coordinate system is used. The top of FIG. 1 is designated as north. Shown in FIG. 1 are four points to be checked for inclusion within the spot beam 100. Point 1 is located within the spot beam 100 and a line drawn from it to the North Pole, the dashed line, intersects with only one segment of spot beam 100. A line from point 2 to the North Pole intersects two segments. This even number of intersections indicates that point 2 is outside of the spot beam 100. A line drawn from point 3 to the North Pole does not intersect with any of the segments of the spot beam 100. Zero intersections indicate that the point is outside of the spot beam 100. An ambiguity arises when a line is drawn from point 4 to the North Pole. This line intersects the polygon of the spot beam 100 at a vertex 103. A determination of one intersection would normally lead to a conclusion of being inside of the spot beam 100. This would be an incorrect conclusion. The present invention includes the step of slightly displacing the point 4 and then recalculating. Point 4' is point 4 after being displaced. A line drawn from point 4' intersects the spot beam 100 twice, indicating that it is outside.

The spot beam 100 is shown here for simplicity as having only three vertices and three line segments. The shape of the spot beams in a system varies considerably. Therefore, the number of vertices and line segments will also vary to accommodate for these variations. In a preferred embodiment of the present invention, these spot beams and their vertices and line segments are stored in memory as a series of line segments, defined by the vertices or endpoints. These vertices, as well as the current position of the aircraft, are preferably expressed in spherical coordinates and measured in float based radians. Floating point arithmetic allows the representation of very large or very small numbers with fewer bits, which is desirable for computer software applications. The present invention is believed to be best implemented with the aid of computer software, but if necessary or otherwise desirable, it could be implemented by mental steps or manually as well.

Figure 2:
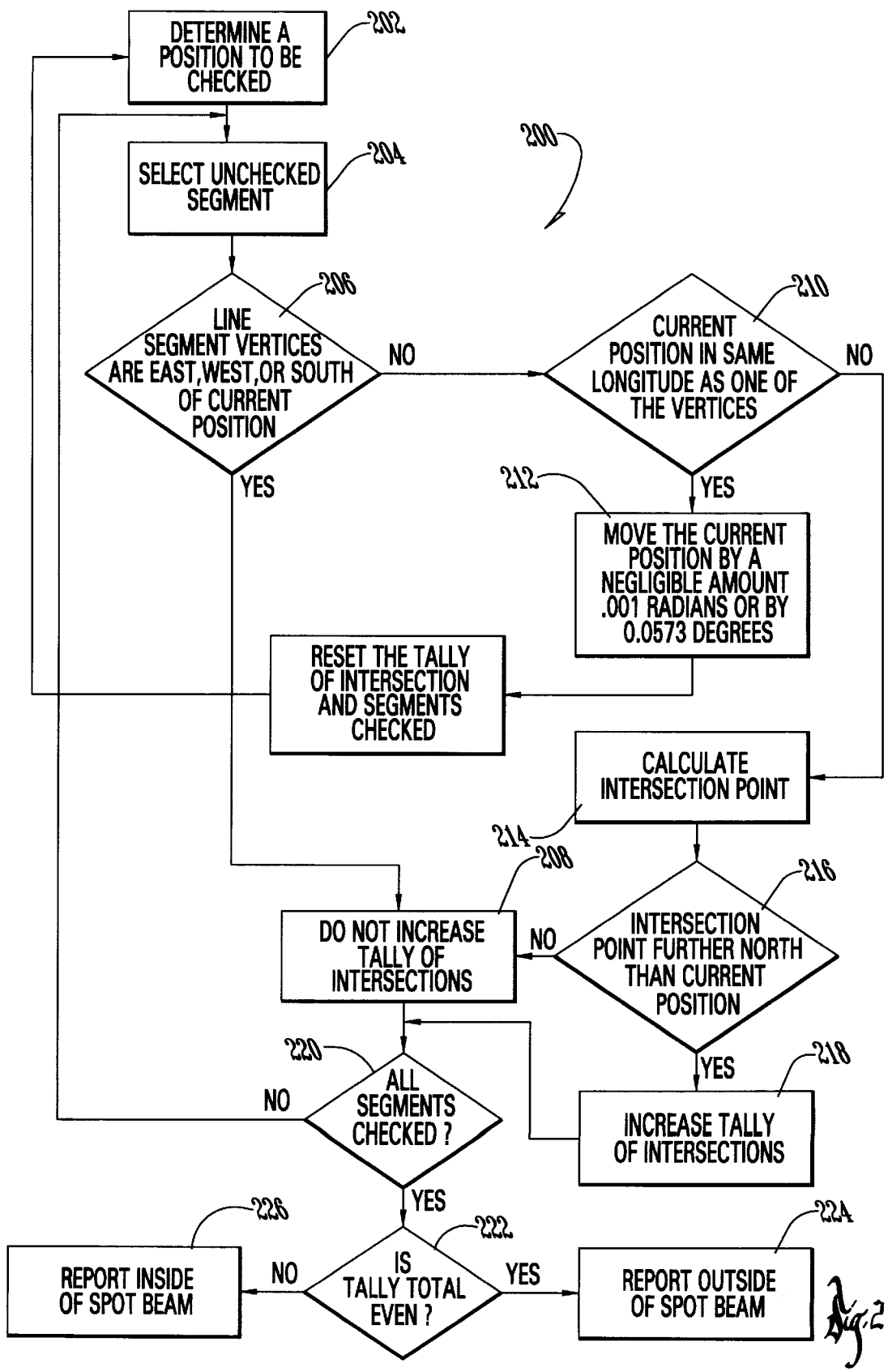
FIG. 2 is a flowchart of the method of the present invention.

Now referring to FIG. 2, there is shown a flowchart of a method of the present invention, generally designated 200.

The method herein is described as a method for determining location of a mobile transceiver within a satellite spot beam, but it should be understood that the method is applicable for determining the inclusion or exclusion of any point in any polygon.

Step 202 starts the innovated method by determining a position to be checked for inclusion in the spot beam 100. This is typically the current position of the aircraft, which is done by known means, such as GPS etc. Depending upon the coordinate system of the GPS, a conversion of the current position to a common coordinate system may be necessary. Next, step 204 involves selecting a line segment from the list of line segments which make up the spot beam 100. These segments are preferably characterized by their vertices. Step 206 involves determining whether the selected segment has both of its vertices either east, west or south of the position being checked. If the answer is yes, then a line drawn from the point to the North Pole would not intersect the segment. Step 208 involves not incrementing the tally of intersections based upon this segment. After step 208, step 220 is accomplished as described below. If step 206 results in a determination of no, then the line segment must have both of its vertices north of the current position, its vertices on each side of the current position. Step 210 determines if the current position is in the same longitude as one of the vertices of the segment; if yes, then step 212 suggests moving the position slightly, preferably to the west by a small amount, approximately 0.001 radians or 0.0573 degrees. Then the tally of intersections and segments checked is reset and the process is started anew with the new, slightly moved location. If the current position is not the same as the longitude of one of the vertices of the segment, per step 210, then in accordance with step 214, the intersection point is determined between the line segment being checked and the line extending to the North Pole. In accordance with step 216, if the point of intersection is further north than the current position, then, in accordance with step 218, the tally of intersections is incremented. After completion of steps 208 or 218, the next step is step 220, which determines if all segments of the spot beam 100 have been checked. If the answer is no, then the step 204 is repeated until the answer to step 220 is yes. Then step 222 determines if the tally total is even or odd. If even, then, in accordance with step 224, a report that the current position is outside of the spot beam 100 is generated. If the result of step 222 is a determination that the tally total is odd, then, in accordance with step 226, a report that the current position is inside of the spot beam is generated.

It is thought that the method and apparatus of the present invention will be understood from the foregoing description and that it will be apparent that various changes may be made in the form, construct steps and arrangement of the parts and steps thereof, without departing from the spirit and scope of the invention or sacrificing all of their material advantages. The form herein described is merely a preferred exemplary embodiment thereof.

I claim:

1. A method for determining the inclusion of a predetermined position within a polygon, comprising the steps of:
   generating a reference line from the predetermined position to some position known to be outside of the polygon;
   making an intersection determination if one of a plurality of line segments, forming a boundary of the polygon, has an endpoint which is along the reference line;
   moving the predetermined position to a displaced location, in response to said intersection determination; and,
   repeating a predetermined process for determination of inclusion of the displaced location in the polygon.

2. A method of claim 1 wherein said predetermined position is a current position of an aircraft.

3. A method of claim 2 wherein said current position is generated by a GPS receiver.

4. A method of claim 1 wherein said reference line is drawn to infinity.

5. A method of claim 1, wherein said reference line is drawn to a Pole of the earth.

6. A method of claim 5 wherein said Pole of the earth is the North Pole.

7. A method of claim 6 wherein said displaced location is less than 5 degrees from the current position.

8. A method of claim 7 wherein said displaced location is less than 1 degree from the current position.

9. A method of claim 8 wherein said predetermined process involves counting a number of times the reference line crosses any of said plurality of line segments.

10. A method of determining inclusion of a position of an aircraft within a satellite communication spot beam, comprising the steps of:
    defining the spot beam as a plurality of adjacent line segments forming a polygon, where each line segment has two vertices;
    determining, for each line segment, whether such segment has both of said vertices on a single side of a reference ray drawn from the position to a known position outside of the spot beam;
    for those segments not having both vertices on a single side of said reference ray, determining if any of said vertices are on said reference ray;
    if any segment has a vertex on the reference ray, then the position is moved to a displaced location, and then returning to said step of determining,
    if no segment has a vertex on the reference ray then, a point of intersection is calculated for each segment through which the ray is drawn;
    generating a total number representative of a number of said points of intersection; and,
    determining whether said total number is even.

11. A method of claim 10 wherein said reference ray is drawn to a North Pole.

12. A method of claim 11 wherein a displaced position is a predetermined distance from said position.

13. A method of claim 12 where said predetermined distance is less than 0.001 radians.

14. A method of claim 13 wherein said predetermined distance is substantially negligible with respect to a rounding characteristic of computations of positions associated with said spot beam.

15. An apparatus for satellite communication by an aircraft in a spot beam, the apparatus comprising;
    means for determining a current position of an aircraft during flight;
    means for executing computer code;
    executable computer code means which performs a function of determining an inclusion characteristic of said current position with respect to a spot beam, where said computer code means is responsive to a determination of whether a ray drawn from the current position to a known point outside of the spot beam is coextensive with a vertex of a line segment defining a polygon boundary which is representative of a boundary characteristic of the spot beam, and the limitation—and where said executable code means is responsive to a displacement of said current position to a displaced location.

16. An apparatus of claim 15 wherein said means for determining a current position of said aircraft is a GPS receiver on said aircraft.

17. An apparatus of claim 16 wherein said means for executing computer code is a microprocessor.

18. An apparatus of claim 17 wherein said executable code means performs a function of tallying a number of intersections of said ray with said polygon boundary.

19. An apparatus of claim 18 wherein said executable code performs a function of determining whether said number of intersections is even.

* * * * *